United States Patent
Tokunaga

(12) 
(10) Patent No.: US 7,210,348 B2
(45) Date of Patent: May 1, 2007

(54) SEMICONDUCTOR DYNAMIC QUANTITY SENSOR

(75) Inventor: Masatoshi Tokunaga, Chiryu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/075,885

(22) Filed: Mar. 10, 2005

(65) Prior Publication Data
US 2005/0204816 A1   Sep. 22, 2005

(30) Foreign Application Priority Data
Mar. 22, 2004   (JP)   ............... 2004-082901

(51) Int. Cl.
*G01C 19/00*   (2006.01)
*G01P 15/00*   (2006.01)

(52) U.S. Cl. .............. 73/504.12; 73/504.14; 73/514.32; 73/514.38

(58) Field of Classification Search ............ 73/504.12, 73/504.16, 504.04, 504.02, 514.32, 514.38, 73/514.36, 504.14
See application file for complete search history.

(56) References Cited

U.S. PATENT DOCUMENTS 6,308,567 B1 * 10/2001 Higuchi et al. .......... 73/504.12
6,316,796 B1 * 11/2001 Petersen et al. ............ 257/254
6,415,663 B1 * 7/2002 Mochida et al. ......... 73/504.12
6,450,033 B1 * 9/2002 Ito et al. .................. 73/514.29
6,796,178 B2 * 9/2004 Jeong et al. ............. 73/504.02
6,807,858 B2 * 10/2004 Orsier ..................... 73/504.12
6,928,872 B2 * 8/2005 Durante et al. .......... 73/504.04

FOREIGN PATENT DOCUMENTS

JP   A-2001-121500   5/2001

* cited by examiner

*Primary Examiner*—Helen Kwok
(74) *Attorney, Agent, or Firm*—Posz Law Group, PLC

(57) ABSTRACT

A semiconductor dynamic quantity sensor includes moving parts displaceable in a predetermined direction over a supporting substrate and a beam portion for connecting said supporting substrate and said moving parts. The beam portion includes beams arranged in parallel and connected together at first end portions by a connecting portion. The beams bend in a direction perpendicular to the longitudinal direction of said beams. Outer side beams have an equal length and are fixed at other end portions to said supporting substrate. The moving parts are connected to the other end portion of another beam. The outer side beams and connecting portion have a parameter (A/B)/(T/L) equal to at least 20.

5 Claims, 4 Drawing Sheets

SEMICONDUCTOR DYNAMIC QUANTITY SENSOR

CROSS REFERENCE TO RELATED APPLICATION

This application is based upon, claims the benefit of priority of, and incorporates by reference the contents of, Japanese Patent Application No. 2004-82901 filed on Mar. 22, 2004.

FIELD OF THE INVENTION

The present invention relates to a semiconductor dynamic quantity sensor, in which a supporting substrate and moving parts are connected through a beam portion and in which the moving parts are displaced in a predetermined direction by the beam portion.

BACKGROUND OF THE INVENTION

In the prior art, there has been proposed (as referred to in Patent Publication 1, (JP-A-2001-121500) for example) a semiconductor dynamic quantity sensor formed by a semiconductor layer supported over a supporting substrate and which includes moving parts to be displaced in a predetermined direction over the supporting substrate, and a beam portion for connecting the supporting substrate and the moving part. The sensor detects a dynamic quantity based on the displacement of the moving parts.

FIG. 6 is a diagram showing a top plan view of a beam portion 50 in a prior art semiconductor dynamic quantity sensor described in Patent Publication 1.

In the beam portion 50 shown in FIG. 6, three beams 51, 52 and 53 are arranged in parallel and connected together by a connecting portion 55 at first end portions. The beam portion 50 bends in a direction X perpendicular to the longitudinal direction Y of the beams 51, 52 and 53.

Here, in the beam portion 50 of the prior art, the two outer beams 51 and 52 of the three beams 51, 52 and 53 have an equal length, and the other end portions of these two outer beams 51 and 52, i.e., the end portions on the side opposed to the connecting portion 55, are fixed to the supporting substrate by a fixing portion 56.

Moreover, in the beam portion 50 of the prior art, a moving part 30 is connected to the other end portion of the central one 53 of the three beams 51, 52 and 53 and not connected to the two outer side beams 51 and 52. Motion of the beam portion 50 in an unnecessary direction is minimized by adopting such a shape of the beam portion 50.

In short, in this beam portion 50, the predetermined direction for the moving part 30 to be displaced is the aforementioned direction X. Further, there is a proportional relationship between the displacement of the moving part 30 in the predetermined direction X and the mass of the moving part 30.

However, according to the inventor's investigations, it has been found that even when the prior art construction of the beam portion 30 is adopted, depending on the size relationship between the width B of the connecting portion 55 and the thickness A of the connecting portion 55, the beam portion 50 will still bend in an unnecessary direction. The thickness A is taken in the longitudinal direction Y of the beam portions 51 to 53. The width B is taken in the direction X perpendicular to the longitudinal direction Y of the beams 51 to 53.

For example, assume a case in which the connecting portion 55 of the beam portion 50 bends in the longitudinal direction Y of the beams 51 to 53, as indicated by broken lines in FIG. 6. Then, the moving part 30 is displaced not only in the predetermined direction X for its displacement but also in the aforementioned longitudinal direction Y, i.e., the unnecessary direction.

SUMMARY OF THE INVENTION

In view of the above problems, it is an object to provide a semiconductor dynamic quantity sensor, in which a supporting substrate and moving parts are connected through a beam portion and in which the moving parts are displaced in a predetermined direction by the beam portion, but which prevents the beam portion as much as possible from being displaced in a direction different from the predetermined direction for the beam portion to be displaced.

In order to achieve the above object, according to a first aspect, a semiconductor dynamic quantity sensor formed in semiconductor layer supported over a supporting substrate includes moving parts adapted to be displaced in a predetermined direction over the supporting substrate and a beam portion for connecting the supporting substrate and the moving parts. The semiconductor dynamic quantity sensor has the following characteristics as described below.

The beam portion includes at least three beams arranged in parallel and connected at first end portions by a connecting portion. The beams bend in a direction perpendicular to the longitudinal direction of the beams.

Two outer side beams of the three beams of the beam portion have an equal length and are fixed at their other end portions to the supporting substrate.

The moving parts of the beam portion are connected to the other end portion of one beam that is not included among the two outer side beams of the at least three beams.

Assuming that the two outer side beams in the beam portion have a length L, the two outer side beams have a width T and that the connecting portion in the beam portion has a width B and a thickness A, a parameter $(A/B)/(T/L)$ expressed by those sizes A, B, L and T is at least 20.

The semiconductor sensor of the first aspect is based on the result of calculations made by the inventor (as referred to FIG. 3). According to this result, the beam portion can bend in the direction perpendicular to the longitudinal direction of the beams while being suppressed as much as possible from bending in the remaining directions, if the parameter $(A/B)/(T/L)$ is 20 or more.

Accordingly, in the semiconductor dynamic quantity sensor in which the supporting substrate and the moving parts are connected through the beam portion so that the moving parts are displaced in the predetermined direction by the beam portion, the beam portion can be prevented as much as possible from being displaced in a direction different from the predetermined direction for its displacement.

According to a second aspect, the parameter $(A/B)/(T/L)$ is at least 30.

According to a third aspect, in the semiconductor dynamic quantity sensor according to the first or second aspect, all of the beams in the beam portion have a substantially equal length.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENTS

Preferred embodiments will be described with reference to the accompanying drawings. Although the preferred embodiment is not limited to such, the preferred embodiments will be described when the semiconductor dynamic quantity sensor is implemented as an angular velocity sensor 100.

Figure 1:
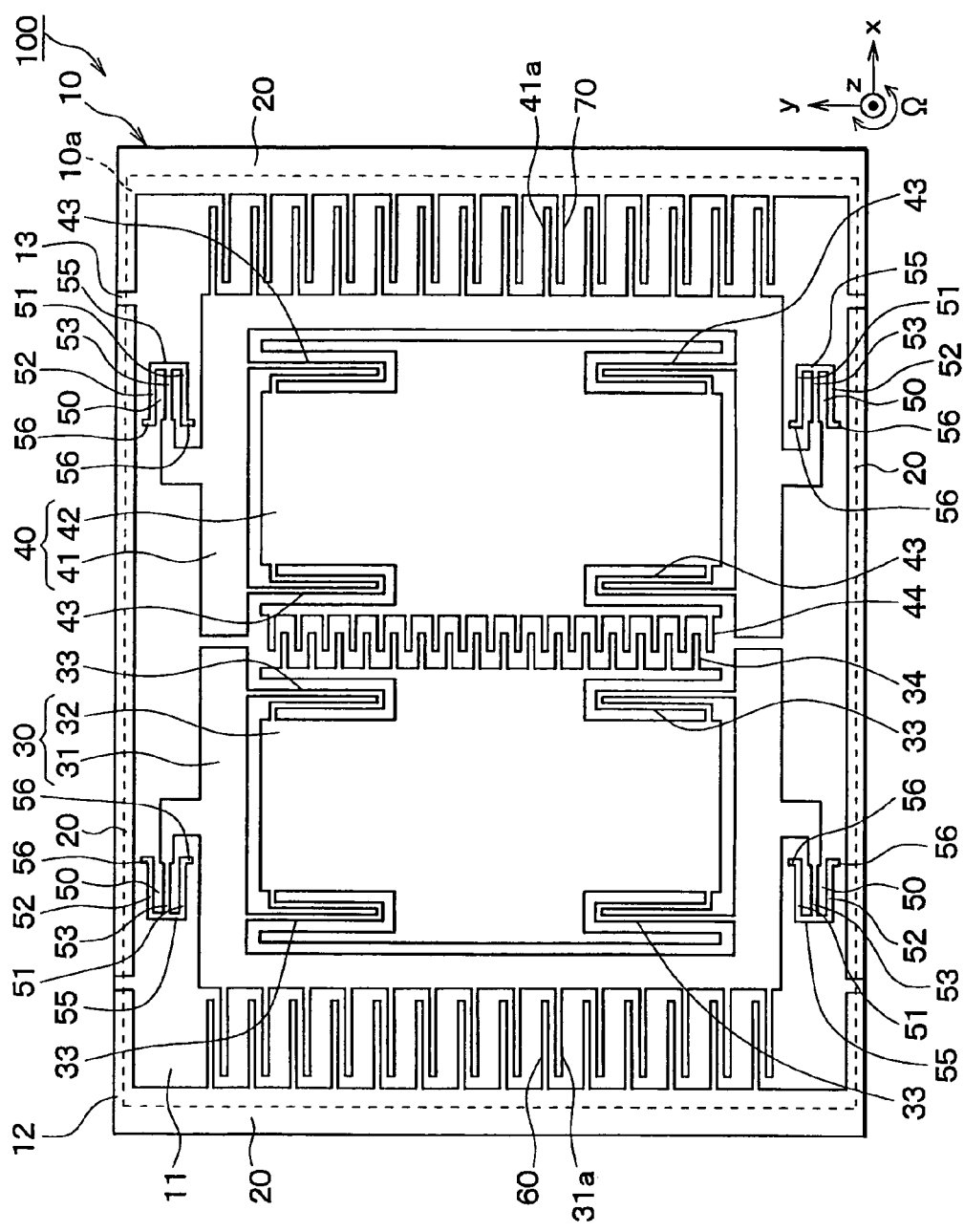
FIG. 1 is schematic plan view of an angular velocity sensor according to a preferred embodiment.
Figure 2:
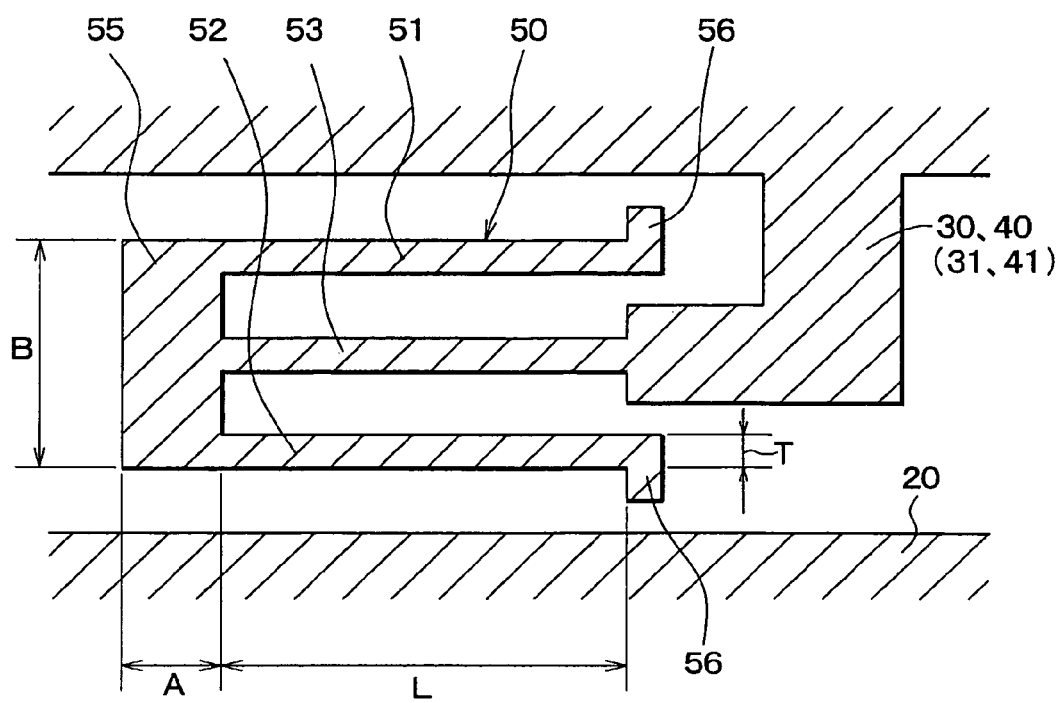
FIG. 2 is an enlarged plan view showing the vicinity of a detecting beam portion in FIG. 1.

FIG. 1 is a diagram showing a schematic plan view of a structure of an angular velocity sensor 100 according to a preferred embodiment. FIG. 2 is an enlarged plan view showing the vicinity of a detecting beam portion 50 in FIG. 1. This angular velocity sensor 100 is formed within a semiconductor substrate 10 made of a silicon substrate or the like.

Specifically, trenches are formed in the semiconductor substrate 10 by well-known semiconductor fabrication techniques such as an etching process, to thereby define and form a structure including a frame-shaped base portion 20, two vibrating portions 30 and 40 (moving parts), individual beam portions 33, 43 and 50, fixed portions 56 and individual electrodes 60 and 70, as shown in FIG. 1. In FIG. 2, the portions other than the trenches are shown as hatched for ease of illustration.

More specifically, the angular velocity sensor 100 shown in FIG. 1 is formed by using an SOI (Silicon On Insulator) substrate, which is prepared by adhering two silicon substrates 11 and 12 through an oxide film 13, for example, as the semiconductor substrate 10.

Moreover, one silicon substrates 11 is formed as the supporting substrate, and the other silicon substrate 12 and the oxide film 13 are subjected, from the surface side of the other silicon substrate 12, to well-known micro-machine working techniques such as the trench etching or sacrificial layer etching processes. Accordingly, the trenches are formed in the other silicon substrate 12, and the structures such as the aforementioned individual portions 20 to 70 defined by the trenches.

Here, FIG. 1 shows the surface side of the other silicon substrate 12 having the aforementioned structure, that is, the surface side of the semiconductor layer 12 supported on the supporting substrate 11. In the inner peripheral portion of an opening portion 10a indicated by broken lines in FIG. 1, at the portions other than the fixed portions 56, the oxide film 13 is formed by the sacrificial layer etching process to thereby expose one supporting substrate 11 below the oxide film 13.

Therefore, in the inner peripheral portion of the opening portion 10a, the semiconductor layer 12 having the aforementioned structure is spaced at the portions other than the fixed portions 56 from the supporting substrate 11.

Thus, in this embodiment, the semiconductor layer 12 is supported at the outer peripheral portion of the opening portion 10a by the supporting substrate 11 through the oxide film 13.

In the inner periphery of the base portion 20, the first vibrating portion 30 located on the left side of FIG. 1, and the second vibrating portion 40 located on the right side, have shapes symmetric to each other. In this embodiment, the two vibrating portions 30 and 40 are arranged along a direction x in FIG. 1 so that they can be displaced on the supporting substrate 11.

The two vibrating portions 30 and 40 include: outer side portions (i.e., first vibrating portions) 31 and 41 having a general shape of letter "C"; inner side portions (i.e., second vibrating portions) 32 and 42 having a generally rectangular shape and positioned on the inner sides of those outer side portions 31 and 41; and driving beam portions 33 and 43 connecting the outer side portions 31 and 41 and the inner side portions 32 and 42.

Moreover, the two vibrating portions 30 and 40 are connected at the outer side portions 31 and 41 to the supporting substrate 11 through the detecting beam portion 50 and the fixed portion 56 and are supported on the one silicon substrate 11.

The driving beam portions 33 and 43 have a degree of freedom in the direction x of FIG. 1 and each is formed into such a general shape of letter "C" as is extended in the direction x and folded back so that it can be elastically deformed in the direction x. In the two vibrating portions 30 and 40, moreover, the inner side portions 32 and 42 can be displaced in the direction x with respect to the outer side portions 31 and 41 by the driving beam portions 33 and 43.

On the other hand, the detecting beam portion 50 has a degree of freedom in a direction y in FIG. 1 and displaces the two vibrating portions 30 and 40 of the moving parts in the direction y over the supporting substrate 11. Moreover, these driving beam portions 33 and 43 and the detecting beam portion 50 have resonance frequencies different from each other.

As shown in FIG. 1 and FIG. 2, each detecting beam portion 50 is constructed by arranging three rod-shaped beams 51, 52 and 53 in parallel and by connecting the first end portions of the three beams 51, 52 and 53 at a connecting portion 55. Moreover, each detecting beam portion 50 bends in the direction y, i.e., in the direction y perpendicular to the longitudinal direction x of the beams 51 to 53.

Referring to FIG. 2, the two outer beams 51 and 52 have an equal length L (as referred to FIG. 2). The two outer beams 51 and 52 are fixed at their other end portions to the silicon substrate 11 by the fixed portions 56 as discussed above. Specifically, the fixed portions 56 are fixed and supported on the silicon substrate 11 through the oxide film 13.

In each detecting beam portion 50, moreover, the moving parts 30 and 40 are connected to the other end portion of the one beam 53 of the three beams 51 to 53 other than the two outer side beams 51 and 52. In the beam portion 50 of this embodiment, moreover, all the beams, i.e., the three beams 51, 52 and 53 are made to have an equal length.

According to this detecting beam portion 50, the two vibrating portions 30 and 40 can be displaced with respect to the fixing portions 56 over the silicon substrate (i.e., the supporting substrate) 11 in the direction y perpendicular to the longitudinal direction x of the beams 51 to 53.

Here in this embodiment, it is assumed, as shown in FIG. 2, that the two outer side beams 51 and 52 in the detecting beam portion 50 have the length L and width T, and that the connecting portion 55 in the detecting beam portion 50 has a width B and a thickness A.

Specifically, the connecting portion 55 has a rectangular shape in its top plan view, as shown in FIG. 2. The width B of the connecting portion 55 is taken along the direction y, i.e., the direction y perpendicular to the longitudinal direction x of the beams 51 to 53. The thickness of the connecting portion 55 is the thickness which is taken along the longitudinal direction x of the beams 51 to 53.

Moreover, in this embodiment, in order to minimize the displacement of the detecting beam portion 50 in a direction different from the predetermined direction y, in which it should be displaced, the parameter (A/B)/(T/L), as expressed by those sizes A, B, L and T, is set to 20 or more, preferably 30 or more.

Returning to FIG. 1, in the inner side portions 32 and 42, at which the first and second vibrating portions 30 and 40 confront each other, there are formed electrode portions (or moving electrodes) 34 and 44, which protrude in a comb-tooth shape. In these individual electrode portions 34 and 44, the comb teeth are arranged to confront and mesh each other.

These electrode portions 34 and 44 function as drive electrodes for driving the two vibrating portions 30 and 40 to vibrate in opposite phases.

A plurality of comb-tooth detecting electrodes (or the detecting stationary electrodes) 60 and 70 for detecting the angular velocity are individually formed at the base portion 20 on the two left and right sides of the two vibrating portions 30 and 40.

The detecting electrodes 60 and 70 are arranged to engage with comb-tooth portions (or detecting moving electrodes) 31a and 41a, which protrude from the outer side portions 31 and 41 of the individual vibrating portions 30 and 40. Moreover, detecting capacitance portions are formed between the detecting electrodes 60 and 70 and the comb-tooth portions 31a and 41a, which confront each other.

Moreover, the first vibration portion 30, the second vibrating portion 40, the detecting electrode 60 on the side of the first vibrating portion 30, and the detecting electrode 70 on the side of the second vibrating portion 40 are electrically insulated from one another by the aforementioned trenches, which define the other silicon substrate 11.

Moreover, although not shown in the figures for ease of illustration, these vibrating portions 30 and 40 and detecting electrodes 60 and 70 are electrically connected with a signal circuit of the angular velocity sensor 100 by the pads which are formed of aluminum in the semiconductor substrate 10.

Operation of the angular velocity sensor 100 will be described. First, drive signals are applied from the signal circuit to the electrode portion 34 of the first vibrating portion 30 and the electrode portion 44 of the second vibrating portion 40.

For example, a first rectangular wave within a range of V0 to 2V0 (e.g., 2.5 to 5 V) for a reference potential V0 is applied to the first vibrating portion 30, i.e., the electrode portion 34. At the same time, a second rectangular wave of the polarity reversed from that of the first rectangular wave within a range of 0 to V0 (e.g., 0 to 2.5 V) is applied to the second vibrating portion 40, i.e., the electrode portion 44.

By applying the voltage between the electrode portion 34 and the electrode portion 44, an electrostatic attraction proportional to the square of the voltage difference is generated between the two electrode portions 34 and 44. As a result, the inner side portions 32 and 42 of the two vibrating portions 30 and 40 are driven to vibrate in the reverse phases in the direction x by the actions of the driving beam portions 33 and 43.

In these driven vibrations, the two vibrating portions 30 and 40, i.e., the two inner side portions 32 and 42 are driven to vibrate in reverse phases but with the common frequency.

If an angular velocity Ω is applied around an axis z (as referred to FIG. 1) while those two vibrating portions 30 and 40 are being driven to vibrate, a Coriolis force acts in the direction y on the individual vibrating portions 30 and 40. With this Coriolis force, the individual vibrating portions 30 and 40 are caused as a whole by the action of the detecting beam portion 50 to detect the vibrations in the direction y in the reverse phases and with the common frequency.

In these vibration detections, the capacitances between the comb teeth in the detecting electrodes 60 and 70 corresponding to the individual vibrating portions 30 and 40 vary according to the magnitude of the applied angular velocity (or the Coriolis force) Ω. This capacitance variation is detected, for example, after being converted into a voltage, by the aforementioned signal circuit. Thus, the angular velocity is detected.

According to this embodiment, the angular velocity sensor 100 formed in the semiconductor layer 12 supported on the supporting substrate 11 comprises: the two vibrating portions 30 and 40 acting as the moving parts to be displaced in the predetermined direction y over the supporting substrate 11; and the detecting beam portion 50 acting as the beam portion for connecting the supporting substrate 11 and the individual vibrating portions 30 and 40, whereby the angular velocity is detected based on the displacements of the two vibrating portions 30 and 40. The angular velocity sensor 100 has the following characteristics.

The detecting beam portion 50 is constructed by arranging the three rod-shaped beams 51, 52 and 53 in parallel and by connecting the first end portions of the three beams 51, 52 and 53 at the connecting portion 55. The detecting beam portion 50 bends in the direction y perpendicular to the longitudinal direction x of the beams 51 to 53.

At the detecting beam portion 50, the two outer beams 51 and 52 of the three beams 51 to 53 have the equal length L and are fixed at their other end portions to the supporting substrate 11.

In each detecting beam portion 50, the vibrating portions 30 and 40 are connected to the other end portion of the one 53 of the three beams 51 to 53 other than the two outer side beams 51 and 52.

The parameter (A/B)/(T/L), as expressed by the individual sizes of the length L of the two outer side beams 51 and 52 of the detecting beam portion 50, the width T of the two outer side beams 51 and 52, the width B of the connecting portion 55 of the beam portion 50 and the thickness A of the connecting portion 55, is 20 or more.

The present angular velocity sensor 100 characterized by these points is based on the result of calculations made the inventor. The specific calculation results are presented in FIG. 3.

Figure 3:
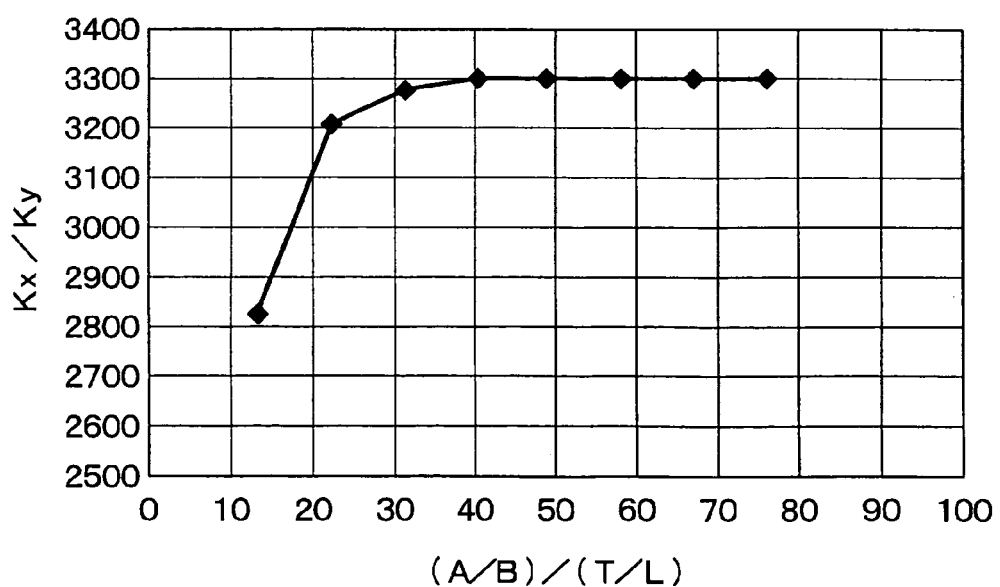
FIG. 3 is a graph plotting a relationship between a parameter (A/B)/(T/L) and a variable (Kx/Ky)

FIG. 3 is a diagram plotting the result of investigations which were made by the analyses of relations between the parameter (A/B)/(T/L) and a variable (Kx/Ky) on the detecting beam portion 50 having the aforementioned characteristics of the embodiment, using the FEM (Finite Element Method).

Here, according to the parameter (A/B)/(T/L), the two outer side beams 51 and 52 bend easily in the direction y for the larger length L but less easily in the direction y for the larger width T, and that the connecting portion 55 bends easily in the direction x for the larger width B but less easily in the direction x for the larger thickness A.

In short, the measure of the directivity for the detecting beam portion 50 to bend can be taken by employing the parameter (A/B)/(T/L), i.e., the ratio of (A/B) to (T/L).

Here, the value Kx is a spring constant, as taken in the direction x, of the vibrating portions 30 and 40 connected to the detecting beam portion 50, and the value Ky is a spring constant, as taken in the direction y, of the vibrating portions 30 and 40 connected to the detecting beam portion 50.

Accordingly, the detecting beam portion 50 becomes stiff and harder to bend in the direction x, namely, the vibrating portions 30 and 40 are hardly displaced in the direction x for the larger value Kx. Likewise, the vibrating portions 30 and 40 become stiff and harder to bend in the direction y, namely, the vibrating portions 30 and 40 are hardly displaced in the direction y for the larger value Ky.

In short, the vibrating portions 30 and 40 are displaced more in the predetermined direction y for the detecting beam portion 50 to be displaced but hardly in the remaining directions for the larger variable (Kx/Ky).

It has been determined, as illustrated in FIG. 3, that the variable (Kx/Ky) abruptly becomes larger as the parameter (A/B)/(T/L) becomes larger, and that the variable (Kx/Ky) abruptly becomes large when the parameter (A/B)/(T/L) becomes 20 or more. As illustrated in FIG. 3, moreover, the value of the variable (Kx/Ky) is substantially saturated when the parameter (A/B)/(T/L) is 30 or more.

In short, if the parameter (A/B)/(T/L) is 20 or more, preferably 30 or more, the detecting beam portion 50 can bend in the direction y perpendicular to the longitudinal direction of the beams 51 to 53 while being suppressed as much as possible in the remaining directions.

According to this embodiment, therefore, the angular velocity sensor 100, in which the supporting substrate 11 and the moving parts 30 and 40 are connected through the detecting beam portion 50 so that the moving parts 30 and 40 may be displaced in the predetermined direction y by the detecting beam portion 50, can suppress displacement of the detecting beam portion 50 in the directions different from the predetermined direction y as much as possible.

Figure 6:
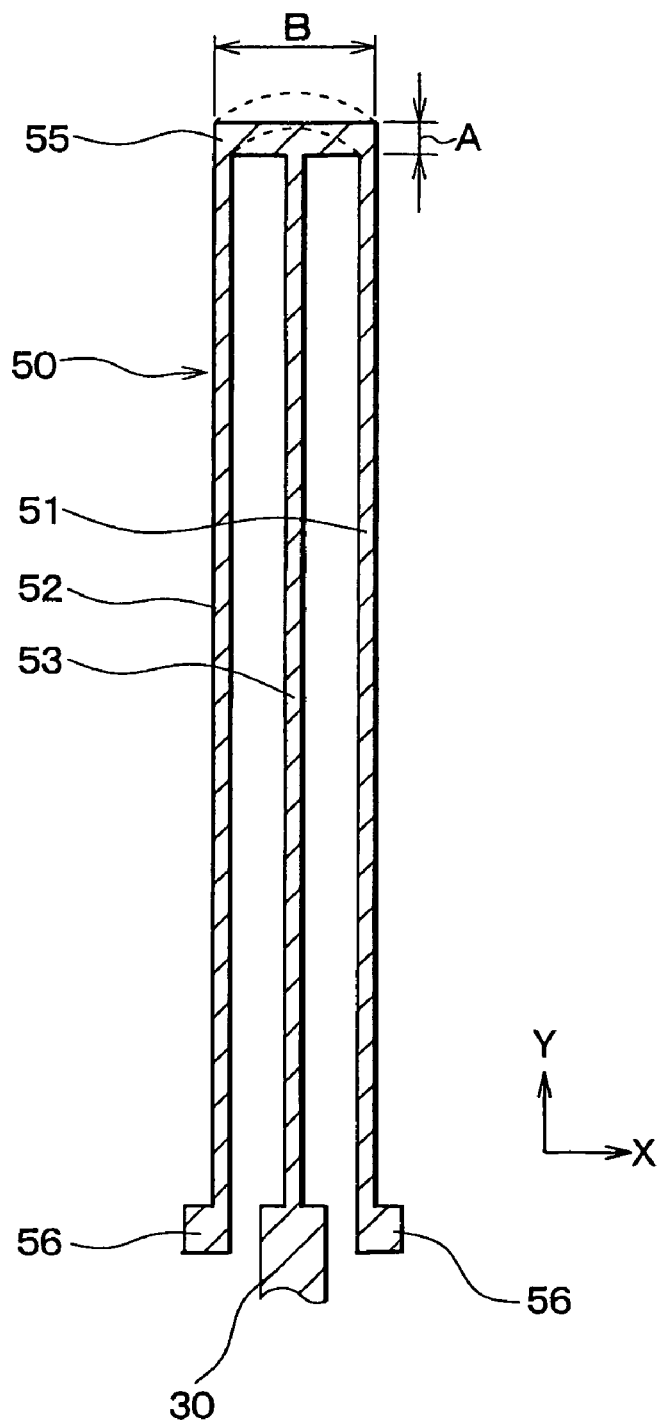
FIG. 6 is a diagram showing a top plan view of a beam portion of a prior art semiconductor dynamic quantity sensor.

As described above with reference to FIG. 6, the thickness A of the connecting portion 55 may be enlarged to sufficiently suppress the bending thereof and to thereby also suppress the displacement of the beam portion 50 in a direction different from the predetermined direction y. However, this enlargement is undesirable because it will also enlarge the structure of the beam portion and the sensor structure.

From such viewpoint, according to this embodiment, the proper characteristics of the beam portion can be retained while suppressing the enlargement of the structure of the beam portion as much as possible, by optimizing the individual sizes of the beam portion with the aforementioned parameter (A/B)/(T/L).

(Other Embodiments)

In the above embodiment, all the beams in the detecting beam portion 50, i.e., the three beams 51, 52 and 53 have substantially the equal length. However, if the two outer side beams 51 and 52 of the three beams 51 to 53 have equal length L, the central beam 53 connected to the vibrating portions 30 and 40 may be longer or shorter than the remaining beams.

Figure 4:
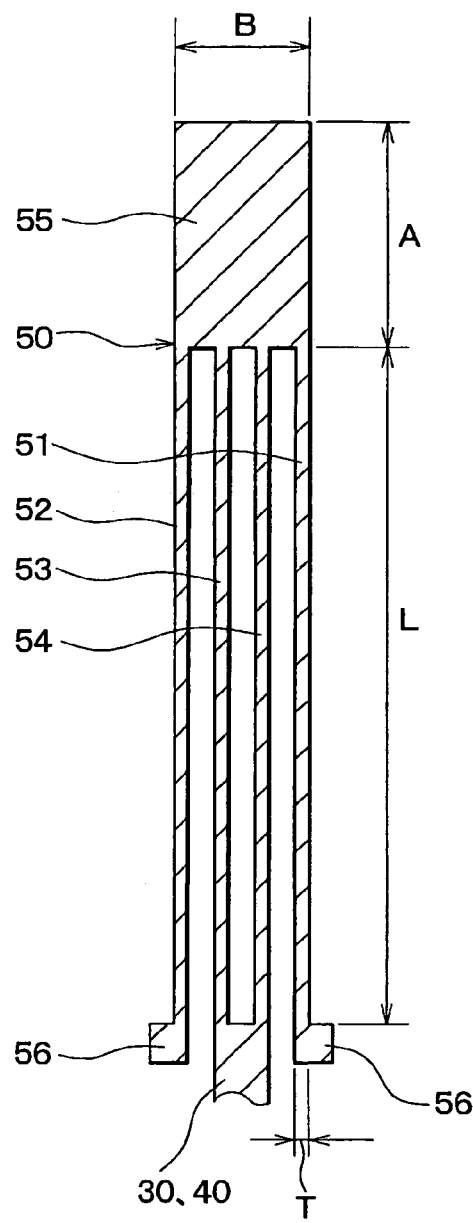
FIG. 4 is a schematic top plan view of the detecting beam portion according to another preferred embodiment.
Figure 5:
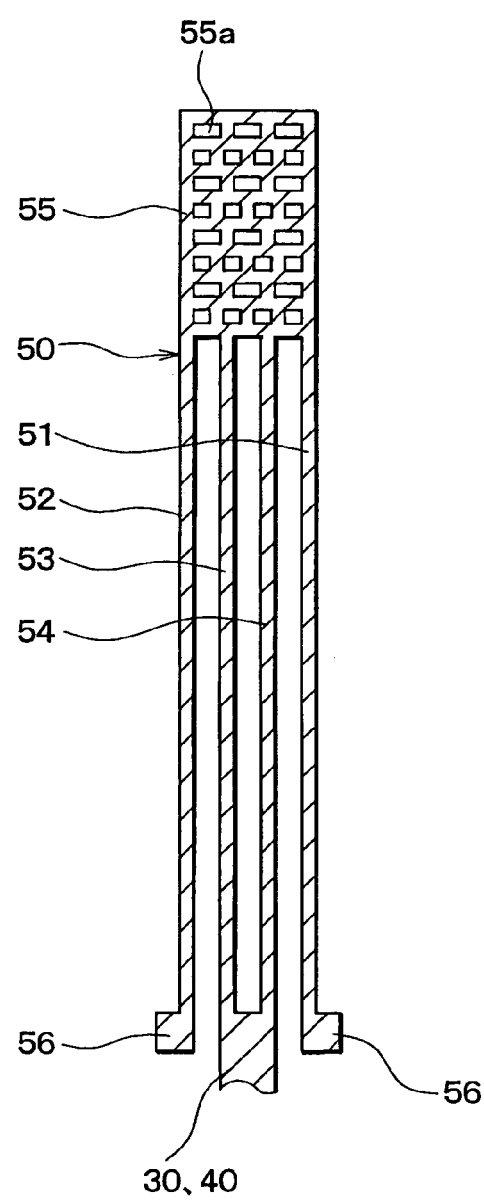
FIG. 5 is a schematic top plan view of the detecting beam portion according to another preferred embodiment.

FIGS. 4 and 5 are schematic top plan views showing other embodiments of the detecting beam portion 50.

As shown in FIG. 4, the detecting beam portion 50 may include two, three or more central beams 53 and 54 connected to the vibrating portions 30 and 40. Generally, beams 51, 52, 53 and 54 may be four or more in the detecting beam portion 50.

As shown in FIG. 5, the connecting portion 55 may include a plurality of through holes 55a extending through in the thickness direction of the other silicon substrate 12. The though holes 55a are formed to improve the etching efficiency in the sacrificial layer etching case of the oxide film 13.

In the angular velocity sensor 100, moreover, the inner side portions 32 and 42 in the individual vibrating portions 30 and 40 are connected to the supporting substrate 11 through the driving beam portions 33 and 43, the outer side portions 31 and 41 and the detecting beam portion 50, so that they can be displaced in the direction x over the supporting substrate 11.

In short, in the angular velocity sensor 100 thus far described, the inner side portions 32 and 42 in the individual vibrating portions 30 and 40 are also constructed as the moving parts, which are connected to the supporting substrate 11 through the beam portions 33 and 43 so that they are displaced in the predetermined direction x over the supporting substrate 11.

By making a suitable design change, therefore, the structure of the beam portion having the characteristics of the foregoing embodiments may be adopted not only at the detecting beam portion 50 but also at the driving beam portions 33 and 43 in the angular velocity sensor 100.

On the other hand, the angular velocity sensor 100 is of the surface worked type, in which the aforementioned structure is formed by working the surface of the other silicon substrate 12 of the SOI substrate 10 in the semiconductor substrate. It is apparent that the invention can also be applied to the back worked type sensor for releasing the moving parts by forming the opening on the side of the one silicon substrate 11, i.e., on the supporting substrate side.

Moreover, the invention can also be applied not only to the aforementioned angular velocity sensor but also to an acceleration sensor, a pressure sensor and so on.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A semiconductor dynamic quantity sensor formed in a semiconductor layer supported over a supporting substrate, comprising:

moving parts displaceable in a predetermined direction over said supporting substrate; and a beam portion for connecting said supporting substrate and said moving parts, wherein said beam portion includes at least three beams arranged in parallel and connected together at first end portions by a connecting portion, wherein said beams bend in a direction perpendicular to a longitudinal direction of said beams, wherein two outer side beams of said at least three beams have an equal length and are fixed at an other end portions to said supporting substrate, wherein said moving parts are connected to the other end portion of another beam not among said two outer side beams of said at least three beams, and wherein the two outer side beams and said connecting portion have a parameter (A/B)/(T/L) equal to at least 20, wherein L represents a length of the two outer side beams in said beam portion, T represents a width of said two outer side beams, B represents a width of said connecting portion in said beam portion, and A represents a thickness of said connecting portion.

2. A semiconductor dynamic quantity sensor according to claim 1, wherein said parameter (A/B)/(T/L) is at least 30.

3. A semiconductor dynamic quantity sensor according to claim 2, wherein all of said at least three beams in said beam portion have an equal length.

4. A semiconductor dynamic quantity sensor according to claim 1, wherein all of said at least three beams in said beam portion have an equal length.

5. A semiconductor dynamic quantity sensor formed in a semiconductor layer supported over a supporting substrate, comprising:

moving parts displaceable in a predetermined direction over said supporting substrate; and a beam portion for connecting said supporting substrate and said moving parts, wherein said beam portion includes two outer side beams and a plurality of central beams provided between said two outer side beams, wherein said two outer side beams and said plurality of central beams are arranged in parallel and connected together at respective first end portions by a connecting portion, wherein said beams bend in a direction perpendicular to a longitudinal direction of said beams, wherein the two outer side beams have an equal length, wherein a respective other end portion of the two outer side beams are fixed to said supporting substrate, wherein said moving parts are connected to a respective other end portion of the central beams, and wherein the two outer side beams and said connecting portion have a parameter (A/B)/(T/L) equal to at least 20, wherein L represents a length of the two outer side beams in said beam portion, T represents a width of said two outer side beams, B represents a width of said connecting portion.

* * * * *